United States Patent
Kim

(10) Patent No.: US 9,232,261 B2
(45) Date of Patent: Jan. 5, 2016

(54) GATEWAY MODULE

(75) Inventor: Nam Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/241,969

(22) PCT Filed: Aug. 31, 2012

(86) PCT No.: PCT/KR2012/007023
§ 371 (c)(1),
(2), (4) Date: Feb. 28, 2014

(87) PCT Pub. No.: WO2013/032298
PCT Pub. Date: Mar. 7, 2013

(65) Prior Publication Data
US 2014/0223499 A1 Aug. 7, 2014

(30) Foreign Application Priority Data
Sep. 1, 2011 (KR) .......................... 10-2011-0088545

(51) Int. Cl.
*H04N 21/426* (2011.01)
*H04N 21/436* (2011.01)
*H04N 21/61* (2011.01)
*H04N 21/2385* (2011.01)

(52) U.S. Cl.
CPC .......... *H04N 21/426* (2013.01); *H04N 21/2385* (2013.01); *H04N 21/42676* (2013.01); *H04N 21/436* (2013.01); *H04N 21/43615* (2013.01); *H04N 21/61* (2013.01); *H04N 21/6112* (2013.01); *H04N 21/6118* (2013.01); *H04N 21/6125* (2013.01)

(58) Field of Classification Search
CPC ... H04N 21/418; H04N 21/426; H04N 21/60; H04N 21/61; H04N 21/6118
See application file for complete search history.

(56) References Cited

U.S. PATENT DOCUMENTS

| 6,305,020 B1 | 10/2001 | Hoarty et al. ................... 725/95 |
| 2001/0030785 A1* | 10/2001 | Pangrac et al. ................ 359/125 |
| 2006/0083253 A1* | 4/2006 | Park et al. ..................... 370/401 |

(Continued)

FOREIGN PATENT DOCUMENTS

| KR | 10-2004-0070509 A | 8/2004 |
| KR | 10-2005-0043282 A | 5/2005 |
| KR | 10-2006-0070239 A | 6/2006 |
| KR | 10-2008-0016250 A | 2/2008 |
| WO | WO 01/69831 A2 | 9/2001 |
| WO | WO 02/01318 A2 | 1/2002 |

OTHER PUBLICATIONS

Han, Intark et al.; "An Integrated Home Server for Communication, Broadcast Reception, and Home Automation"; IEEE Transactions on Consumer Electronics; vol. 52; No. 1; Feb. 2006; pp. 104-109.

(Continued)

*Primary Examiner* — Kyu Chae
(74) *Attorney, Agent, or Firm* — KED & Associates LLP

(57) ABSTRACT

A gateway module according to the disclosure includes an Ethernet connector for receiving a broadcasting signal and a network signal through a coaxial cable to separate to the broadcasting signal from the network signal, a network switch for selecting at least one from a plurality of internal communication networks to transmit the separated network signal to the selected communication network, and an interface part for receiving and transmitting the separated network signal to a TV, in which the gateway module is mounted on one surface of the TV.

8 Claims, 4 Drawing Sheets

(56) References Cited

U.S. PATENT DOCUMENTS

| | | | |
|---|---|---|---|
| 2006/0136968 A1 | 6/2006 | Han et al. | 725/71 |
| 2007/0250872 A1* | 10/2007 | Dua | 725/81 |
| 2009/0092154 A1* | 4/2009 | Malik et al. | 370/480 |
| 2009/0279892 A1* | 11/2009 | Kim et al. | 398/67 |
| 2011/0126255 A1 | 5/2011 | Perlman et al. | 725/116 |
| 2011/0273616 A1* | 11/2011 | Zhai et al. | 348/554 |
| 2011/0310297 A1* | 12/2011 | Gawel et al. | 348/552 |
| 2012/0143730 A1* | 6/2012 | Ansari et al. | 705/27.1 |

OTHER PUBLICATIONS

International Search Report dated Feb. 28, 2013 issued in Application No. PCT/KR2012/007023.

Korean Notice of Allowance dated Nov. 20, 2013 issued in Application No. 10-2011-0088545.

European Search Report issued in application No. 12827825.6 dated Jan. 26, 2015.

* cited by examiner

GATEWAY MODULE

CROSS-REFERENCE TO RELATED PATENT APPLICATIONS

This application is a U.S. National Stage Application under 35 U.S.C. §371 of PCT Application No. PCT/KR2012/007023, filed Aug. 31, 2012, which claims priority to Korean Patent Application No. 10-2011-0088545, filed Sep. 1, 2011.

TECHNICAL FIELD

The disclosure relates to a TV-mounted gateway module. More particularly, the disclosure relates to a gateway module capable of simplifying a network arrangement by mounting a network gateway module in a TV.

BACKGROUND ART

A home network system is a system for controlling PCs, peripheral devices, portable phones, and electronic appliances at home by connecting the PCs, the peripheral devices, the portable phones, and the electronic appliances to each other. The home network system is configured in that a user may access a network constructed at home through the Internet or a telephone line inside and outside the system to control various digital electronic appliances such as computers, digital TV receivers, digital video players, and coolers/heaters.

A wireless near field communication scheme used to construct such a home network may include a Bluetooth scheme, a Zigbee scheme, and a wireless LAN scheme.

Among them, the wireless LAN scheme refers to a scheme of constructing a network using electric wave or light instead of a wired LAN network, and uses a technology based on narrowband, infrared, and spread spectrum.

Hereinafter, the related art will be described with reference to FIG. 1.

Referring to FIG. 1, a network according to the related art mainly includes a broadband communication network 10, a gateway 20, and a terminal 30.

FIG. 2 is a block diagram illustrating a schematic configuration of the gateway 20.

The gateway 20 may include a switch, a controller, a communication part, a storage unit, and a power supply. A fundamental configuration of the gateway 20 is generally known in the network field, so the description of the gateway 20 will be omitted.

The gateway 20 is used to distribute network data provided from an external broadband communication network 10 to the terminal 30. In this case, the distribution of the network data is achieved on a wireless network (WLAN) and a wired network.

The gateway 20 has one wide area network (WAN) and a plurality of local area networks (LANs), a WAN port performs a function for accessing a broadband communication network, and the LAN performs a function for accessing an internal communication network. That is, the gateway 20 is aimed at distributing one WAN to the LANs, and the LAN is aimed at exchanging data between internal networks.

However, there is a problem in that a scheme of processing network data through a conventional gateway 20 causes an unnecessary space, and the Internet cannot be used in a place where the LAN is not installed.

Since a Service Set Identifier (SSID) serving as a unique identifier of the gateway 20, a password for security, and a bandwidth supported from the gateway 20 are set through accessing the Internet, the controlling of the gateway 20 is very difficult.

DISCLOSURE OF INVENTION

Technical Problem

The embodiment provides a TV-mounted gateway module capable of simplifying a network arrangement by mounting a gateway module in a TV.

The embodiment provides a TV-mounted gateway module capable of simply controlling a gateway module using a TV UI.

Solution to Problem

According to the embodiment, there is provided a gateway module including an Ethernet connector for receiving a broadcasting signal and a network signal through a coaxial cable to separate the broadcasting signal from the network signal; a network switch for selecting at least one from a plurality of internal communication networks to transmit the separated network signal to the selected communication network; and an interface part for receiving and transmitting the separated network signal to a TV, wherein the gateway module is mounted on one surface of the TV.

Advantageous Effects of Invention

The embodiment has following effects.

Firstly, a near field communication network can be used using a coaxial cable in a place where the near field communication is not installed.

Secondly, a gateway module can be integrated with a TV to simplify a network arrangement.

Thirdly, the gateway module is controlled through a TV UI so that setting a network device can be simplified.

BEST MODE FOR CARRYING OUT THE INVENTION

Hereinafter, the embodiment of the present invention will be described so that those skilled in the art can easily comprehend the disclosure.

Figure 1:
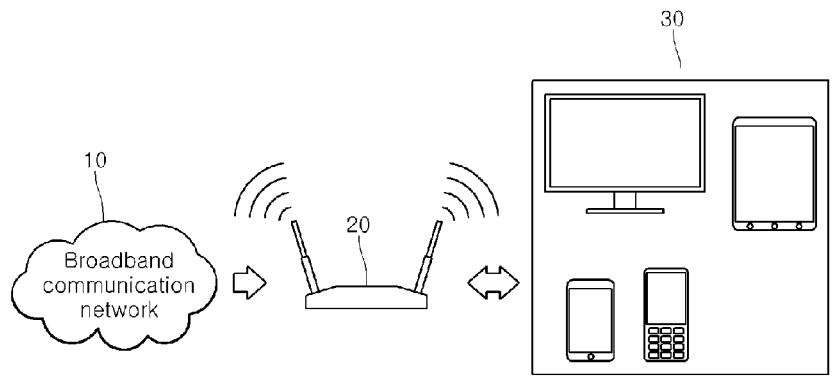
FIG. 1 is a diagram illustrating a communication system using a network gateway according to the related art.
Figure 2:
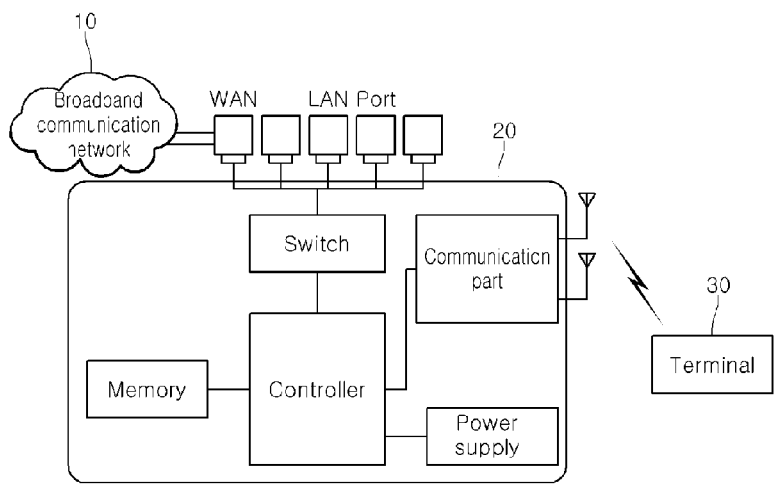
FIG. 2 is a block diagram illustrating a schematic configuration of a gateway according to the related art.
Figure 3:
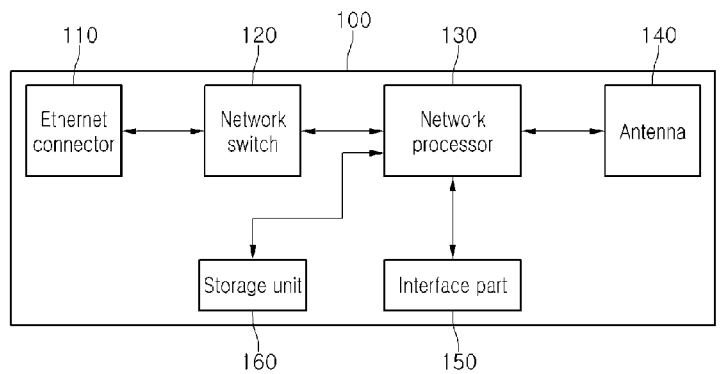
FIG. 3 is a block diagram illustrating a schematic configuration of a TV-mounted gateway module according to the embodiment.

FIG. 3 is a block diagram illustrating a schematic configuration of a TV-mounted gateway module according to the embodiment.

The TV-mounted gateway module 100 may include an Ethernet connector 110, a network switch 120, a network processor 130, an antenna 140, an interface part, and a storage unit 160.

The Ethernet connector 110 may be connected to a coaxial cable transmitting a broadcasting signal and a network signal from an external communication network. That is, the Ethernet connector 110 may receive the broadcasting signal and the network signal through the coaxial cable. The Ethernet connector 110 may include a diplexer 111, a radio frequency (RF) transceiver 112, and an Ethernet media independent interface (MII) 113, and a detailed description thereof will be given later with reference to FIG. 4.

The network switch 120 may select one of a plurality of internal communication networks to which the network signal is transmitted. That is, the network switch 120 may select a certain communication network from the internal communication networks and distribute a network signal received from a broadband communication network to the selected communication network.

The network switch 120 may transmit the network signal to only a communication network requiring the network signal of the internal communication networks.

The network switch 120 may store a unique media access control (MAC) address of a terminal connected to each internal communication network, and can determine the network signal to be transmitted and the destination of the network signal based on the MAC address.

The network switch 120 may transmit the network signal to at least one of the internal communication networks.

The network processor 130 may control wired/wireless LAN access operations with respect to the TV, and control an operation of each functional part of the gateway module 100.

The network processor 130 may control an Ethernet media independent interface (MII) 113 to be described below for accessing an external communication device.

The antenna 140 may transmit the network signal to the TV.

The interface part 150 may connect the gateway module 100 to the TV receiving the broadcasting signal to exchange information.

The interface part 150 may include a universal asynchronous receiver/transmitter (UART) 151, a power supply 152, a controller 153, and a serial communication module 154.

The storage unit 160 may store a broadcasting signal and the network signal, as well as application programs and various softwares necessary for driving the gateway module 100.

The storage unit 160 may include a storage medium having at least one type of a flash memory type, a hard disk type, a multimedia card micro type, a card type (for instance, SD or XD memory), a RAM, and a ROM (EEPROM).

Figure 4:
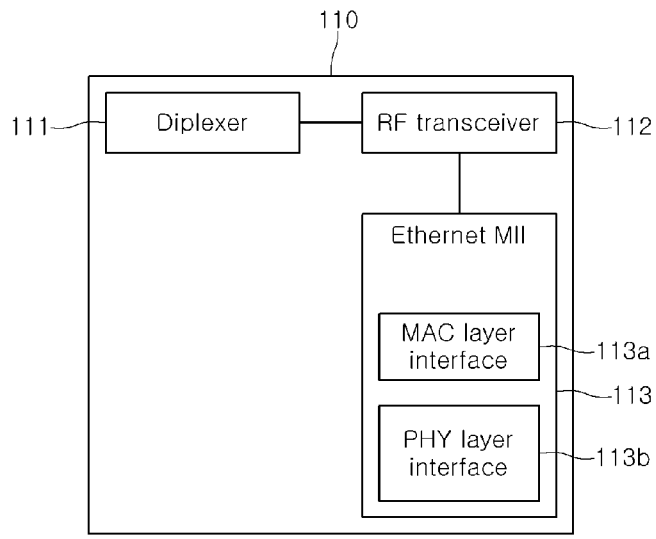
FIG. 4 is a block diagram illustrating a schematic configuration of an Ethernet connector according to the embodiment.

FIG. 4 is a block diagram illustrating a schematic configuration of an Ethernet connector according to the embodiment.

The Ethernet connector 110 may include a diplexer 111, an RF transceiver 112, and an Ethernet media independent interface (MII) 113.

The diplexer 111 may separate a broadcasting signal and a network signal provided through a coaxial cable to set a path of respective signals.

The diplexer 111 may transmit a broadcasting signal provided through a coaxial cable to a main board of the TV through a tuner, and transmit a network signal provided through the coaxial cable to the network processor 130 through the Ethernet connector 110.

The RF receiver 112 accesses a broadband communication network providing the network signal to receive the network signal from the broadband communication network.

The RF transceiver 112 may be configured by a single DSP to selectively support IEEE 802.11bg and IEEE 802.11a or may be configured by two DSPs to simultaneously support the IEEE 802.11bg and the IEEE 802.11a.

The Ethernet MII 113 may control an access operation of the Ethernet connector 110 and the network processor 130.

The Ethernet MII 113 may include an MAC layer interface 113a and a physical (PHY) layer interface 113b.

The MAC layer interface 113a and a physical layer (PHY) interface 113b are matched with TX data (4bit), a TX clock, a TX Enable, RX data (4bit), an RX clock, an RX Valid, and a CRS (circuit reset).

The TX data and RX data are achieved by 4 bit data buses exchanging data between the MAC layer interface 113a and the physical layer (PHY) interface 113b, and each bus is synchronized by a separate clock.

That is, the TX clock is used as a reference clock of a TX bus, and the RX clock is used as a reference clock of an RX bus.

Further, the TX enable serves as a signal for informing the other party (receiving side) of the signal transmission when data to be transmitted are prepared, and is connected to a receiving side RX Valid.

To normally operate the foregoing signals, a reference clock is needed, and a clock of 25 MHz is generally supplied to a clock supply part.

Accordingly, a general Ethernet MII device 113 transceives data by using a clock inputted thereto as a reference clock.

Due to the Ethernet connector 110, a near field communication network can be used in a place where the near field communication network is not installed by using a coaxial cable.

Figure 5:
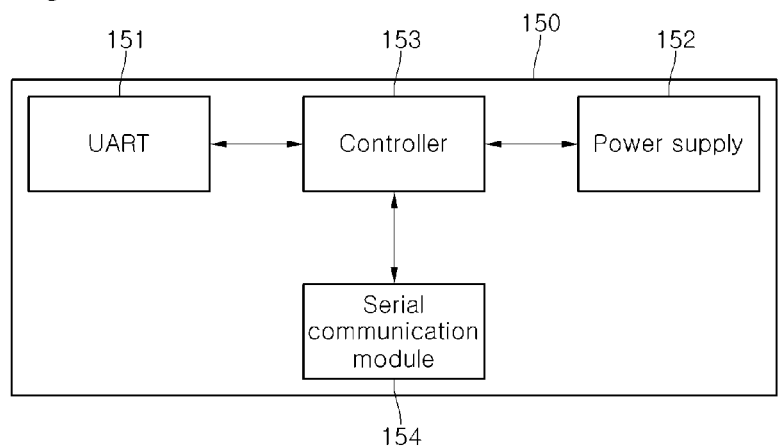
FIG. 5 is a block diagram illustrating a schematic configuration of an interface part according to the embodiment.

FIG. 5 is a block diagram illustrating a schematic configuration of an interface part according to the embodiment.

The interface part 150 may include a UART 151, a power supply 152, a controller 153, and a serial communication module 154.

The UART 151 may transceive exchanged information between the TV and the gateway module 100 in an Ethernet communication scheme.

The UART 151 may be generally used according to a communication protocol such as EIA RS-232, RS-422, or RS-485.

The power supply 152 may supply power to the UART 151 and the interface part 150.

The controller 153 may control an operation of each functional part of the interface part 150.

The serial communication module 154 may connect the gateway module 100 to the TV using a protocol for Ethernet communication between the TV and the gateway module.

A user may set a Service Set Identifier (SSID) serving as a unique identifier of the gateway module 100, a password for security, and a bandwidth supported from the gateway module 100.

That is, the user may easily set the gateway module 100 using a remote controller through a display screen of the TV. Accordingly, convenience for the user is increased.

Figure 6:
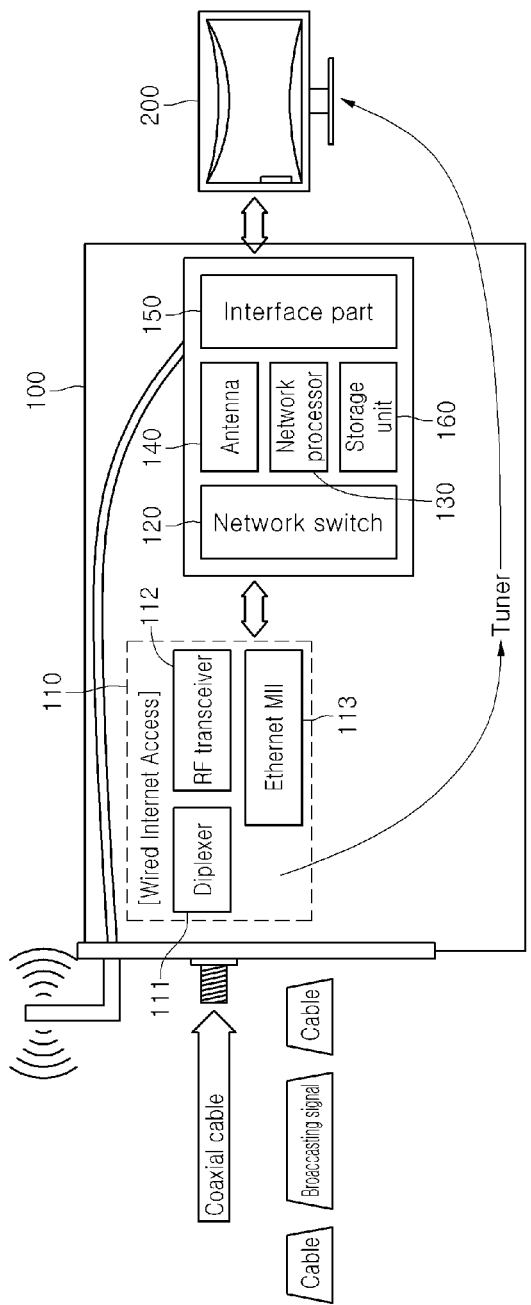
FIG. 6 is a diagram illustrating a procedure of transmitting a broadcasting signal and a network signal using a TV-mounted gateway module according to the embodiment.

FIG. 6 is a diagram illustrating a procedure of transmitting a broadcasting signal and a network signal using a TV-mounted gateway module according to the embodiment.

A broadcasting signal and a network signal having different frequency bands are inputted to the Ethernet connector 110 through a coaxial cable. A diplexer 111 of the Ethernet connector 110 separates the broadcasting signal and the network signal from each other and transmits the separated broadcasting signal and the separated network signal to different transmission paths, respectively.

The diplexer 111 may transmit the broadcasting signal to a main board of the TV 200 through a tuner, and transmit the network signal to the network processor 130 through the diplexer 111.

Through the procedure as illustrated above, since the user may use a near field communication network by using a coaxial cable in a place where the near field communication network is not installed, the gateway module may be employed when a LAN is not available in a hotel, a resort, or multiple dwellings.

Figure 7:
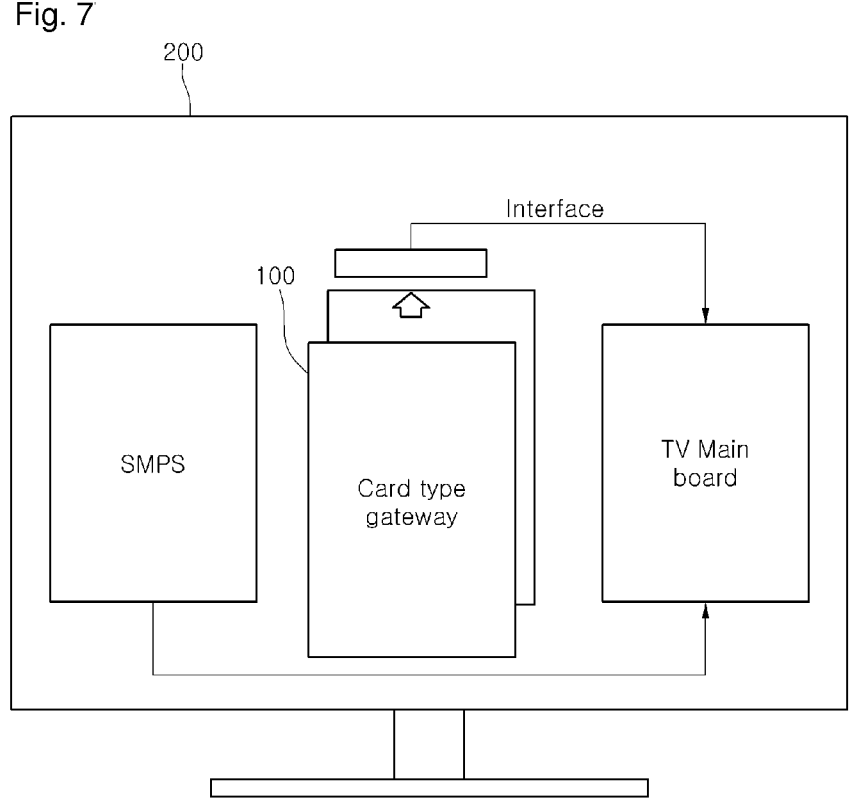
FIG. 7 is a block diagram illustrating a structure in which a gateway module is mounted on a back surface of a TV according to an embodiment.

FIG. 7 is a block diagram illustrating a structure in which a gateway module is mounted on a back surface of a TV according to an embodiment.

Referring to FIG. 7, the gateway module 100 may be attached to one surface of the TV 200, particularly, a back surface. The user may easily perform overall setting with respect to the gateway module 100 through a display screen of the TV 200. That is, the user may connect a remote controller to the interface part 150 to control the gateway module 100, thereby easily setting a network device.

Further, the gateway module 100 according to the embodiment may be mounted in a slot formed in one surface of the TV 200.

The TV according to the embodiment may include a network TV, an HBBTV, and a smart TV.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A gateway module comprising:
an Ethernet connector for receiving a broadcasting signal and a network signal through a coaxial cable to separate the broadcasting signal from the network signal;
a network switch for selecting a certain internal communication network for transmitting the network signal from a plurality of internal communication networks and to distribute the network signal to the selected certain internal communication network;
an antenna for transmitting the network signal distributed by using the selected certain internal communication network to a display device; and
an interface to connect the gateway module with the display device, and the interface to exchange information using a protocol for Ethernet communication between the display device and the gateway module,
wherein the separated broadcasting signal is transmitted to the display device through a tuner,
wherein the gateway module is mounted on one surface of the display device,
wherein the gateway module receives setting information that is transmitted from a remote controller of the display device, and
wherein the setting information includes a Service Set Identifier (SSID) serving as a unique identifier of the gateway module, a password for security, and a bandwidth supported from the gateway module,
wherein the Ethernet connector comprises:
a diplexer for separating the broadcasting signal and the network signal from each other;
a radio frequency (RF) transceiver for accessing a broadband communication network providing the network signal; and
an Ethernet media independent interface (MII) for controlling an access operation of the Ethernet connector and a network processor, wherein the diplexer transmits the broadcasting signal to the display device through the tuner, and transmits the network signal to the network processor.

2. The gateway module of claim 1, wherein the Ethernet MII comprises a media access control (MAC) layer interface and a physical (PHY) layer interface.

3. The gateway module of claim 1, wherein the interface comprises:
a Universal Asynchronous Receiver/Transmitter (UART) for transceiving exchanged information between the display device and the gateway module in an Ethernet communication scheme;
a power supply for supplying power to the UART; and
a controller for controlling an operation of each functional part.

4. The gateway module of claim 3, wherein the interface further comprises a serial communication module using a protocol for Ethernet communication between the display device and the gateway module.

5. The gateway module of claim 1, further comprising a storage unit for storing the broadcasting signal and the network signal.

6. The gateway module of claim 5, wherein the storage unit comprises a double data rate (DDR) memory and a flash memory.

7. The gateway module of claim 1, wherein the gateway module is mounted in a slot formed on one surface of the display device.

8. A display device equipped on one surface thereof with the gateway module of claim 1.

* * * * *